United States Patent [19]

Castera et al.

[11] 4,236,782
[45] Dec. 2, 1980

[54] DEVICE FOR MODULATING OPTICAL RADIATION BY A VARIABLE MAGNETIC FIELD

[75] Inventors: Jean-Paul Castéra; Georges Hepner, both of Paris, France

[73] Assignee: Thomson-CSF, Paris, France

[21] Appl. No.: 921,226

[22] Filed: Jun. 30, 1978

[30] Foreign Application Priority Data

Jul. 8, 1977 [FR] France ............... 77 21189

[51] Int. Cl.³ .................................................. G02B 5/14
[52] U.S. Cl. ........................... 350/96.13; 350/96.12; 350/151; 350/355
[58] Field of Search ............ 350/96.12, 96.13, 96.15, 350/96.17, 96.31, 96.34, 353, 355, 151

[56] References Cited

U.S. PATENT DOCUMENTS

| | | | |
|---|---|---|---|
| 3,667,832 | 6/1972 | Kitano et al. ............... | 350/96.31 X |
| 3,756,690 | 9/1973 | Borrelli et al. ............... | 350/151 |
| 3,764,195 | 10/1973 | Blank et al. ............... | 350/96.13 |
| 3,830,555 | 8/1974 | Warner ............... | 350/96.13 |
| 3,870,397 | 3/1975 | Dillon, Jr. et al. ............... | 350/96.13 |
| 3,990,776 | 11/1976 | Tseng et al. ............... | 350/96.13 |
| 3,995,936 | 12/1976 | Hepner et al. ............... | 350/96.12 |
| 4,032,216 | 6/1977 | Henry ............... | 350/96.13 |
| 4,032,217 | 6/1977 | Coeuré et al. ............... | 350/96.12 |

FOREIGN PATENT DOCUMENTS 2170141 9/1973 France .
2281585 3/1976 France .
2305752 10/1976 France .
2306456 10/1976 France .

OTHER PUBLICATIONS

Hepner et al., "Magnetooptic Effects in Garnet Thin Film Waveguides", *Applied Optics,* vol. 14, No. 7, Jul. 1975, pp. 1479-1481.
Lohmann, "Magneto-Optical Light Fibers", *IBM Tech. Discl. Bulletin,* vol. 12, No. 6, Nov., 1969, pp. 788-789.
Tien et al., "Switching and Modulation of Light in . . . ", *Appl. Phys. Ltr.,* vol. 21, No. 8, Oct. 1972, pp. 394-396.
Tseng et al., "Mode Conversion in Magneto-Optic Waveguides . . . ", *Appl. Phys. Ltr.,* vol. 24, No. 6, Mar. 1974, pp. 265-267.

*Primary Examiner*—Edward S. Bauer
*Assistant Examiner*—John D. Lee
*Attorney, Agent, or Firm*—Cushman, Darby & Cushman

[57] ABSTRACT

The device according to the invention comprises a wave guide formed by a thin layer of a ferrimagnetic garnet deposited onto a substrate, preferably by epitaxy, and capable of propagating first and second modes of radiated energy, means for exciting the first mode in said layer, means for inducing a magnetic field in the propagation direction to enable at least a fraction of the propagated energy to be transferred from the first mode towards the second mode, means for selectively transmitting one of the two modes situated in front of the guide, for example a metallic layer deposited onto the thin layer and means for extracting the energy of the transmitted mode.

10 Claims, 8 Drawing Figures

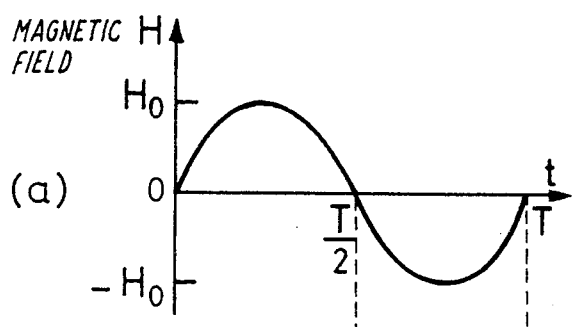
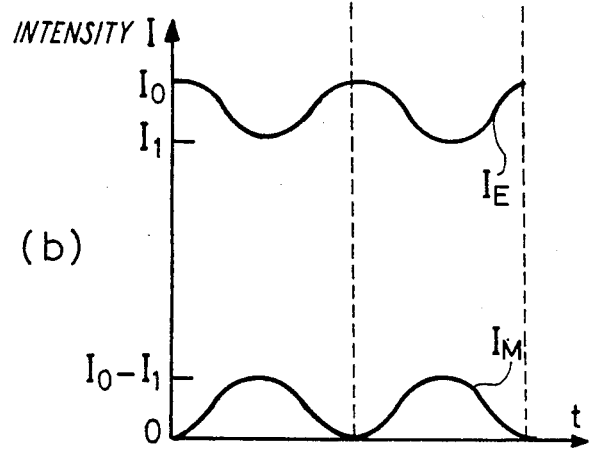
FIG. 2
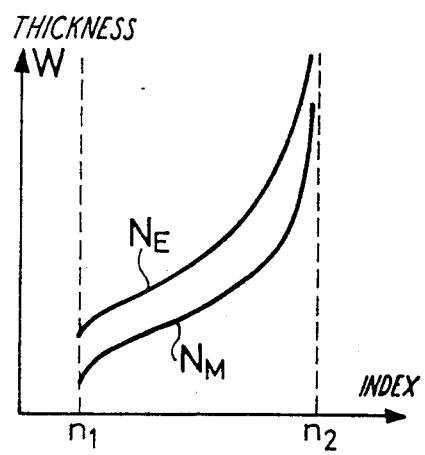
(a)
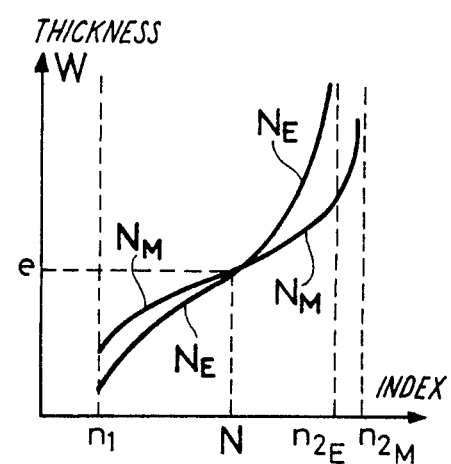
(b)
FIG. 3

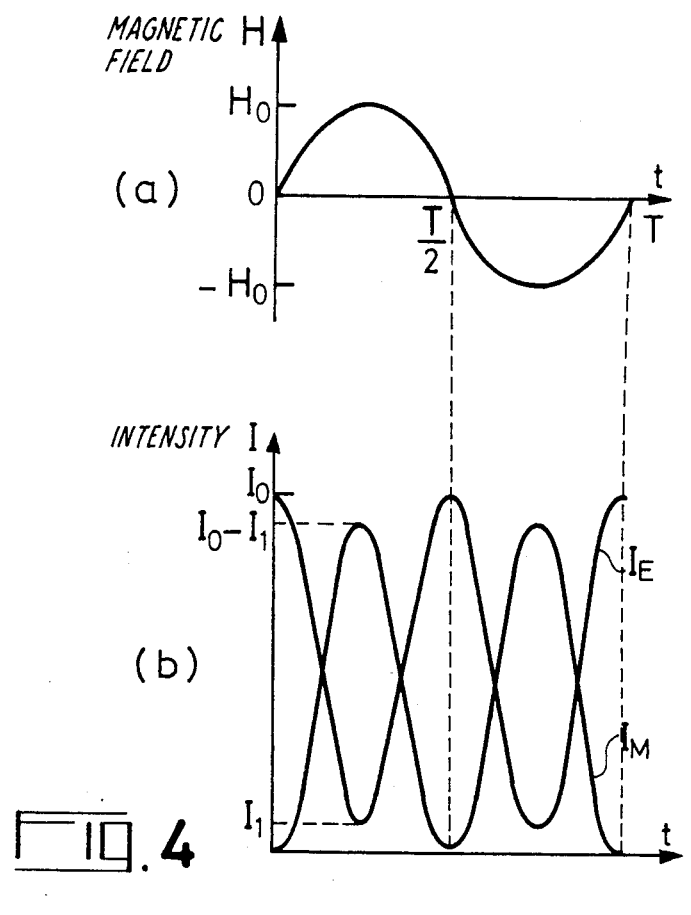
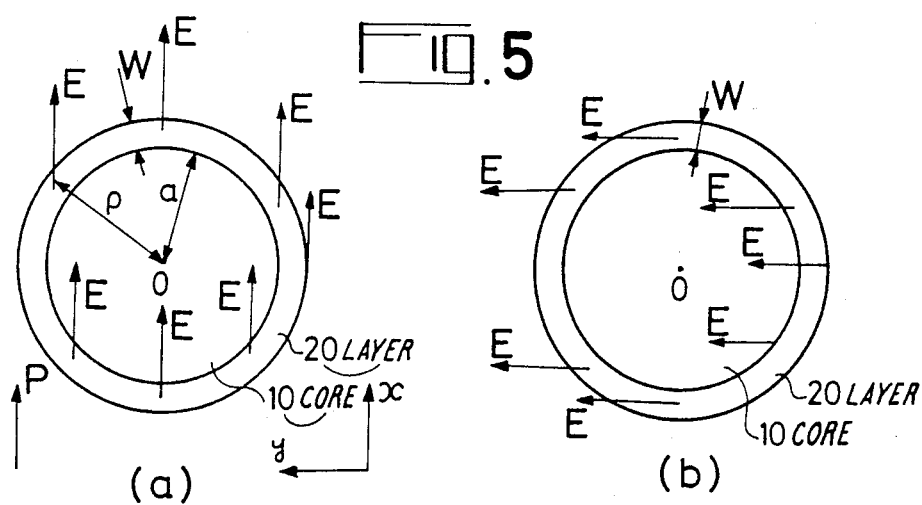

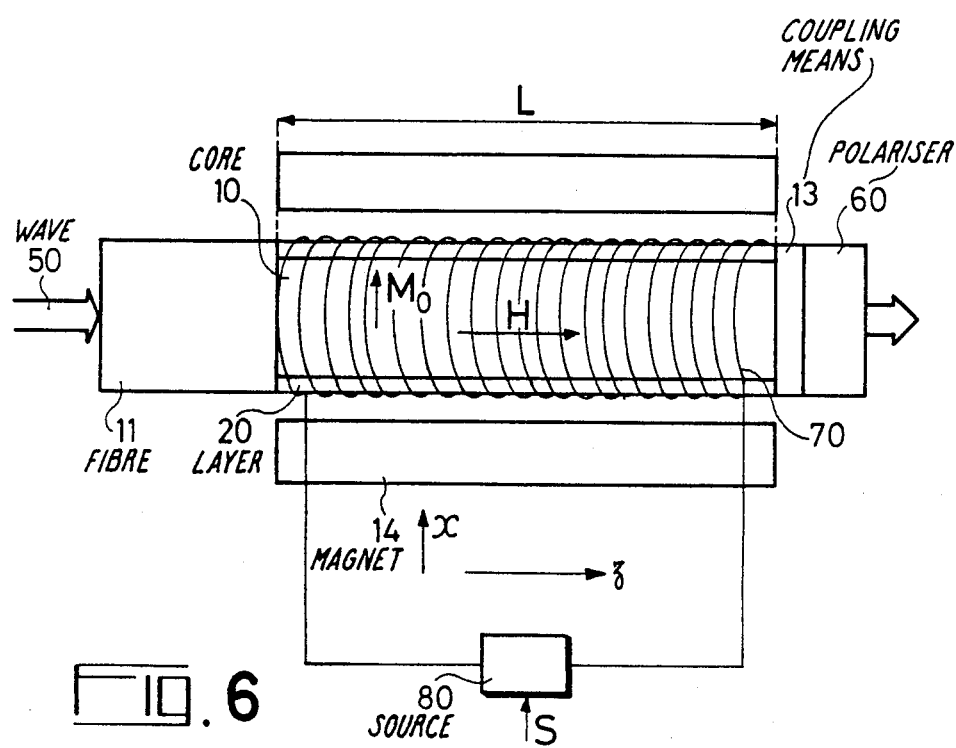

DEVICE FOR MODULATING OPTICAL RADIATION BY A VARIABLE MAGNETIC FIELD

This invention relates to devices for modulating optical radiation by a magnetic field, comprising a thin magnetic layer. In conventional optics, magneto-optical modulators have been produced from paramagnetic and ferromagnetic materials, particularly garnets (yttrium-/iron garnet for example). Devices such as these require considerable magnetic control fields. The magneto-optical effects are also utilised in thin-layer technology, particularly for producing non-reciprocal devices, such as non-reciprocal junctions. Devices such as these are based on the conversion of modes by Faraday effect or by Cotton-Moutton effect. The object of the present invention is to utilise these magneto-optical phenomena for producing a thin-layer magneto-optical intensity modulator. A modulator such as this has several advantages over existing modulators: the magnetic control fields are less intense. It is simple to produce and inexpensive because it uses thin magnetic layers which are readily obtained by epitaxy from ferrimagnetic garnets. For separating the modes at the guide exit, the invention proposes using a metallic layer of minimal thickness which is very easy to produce; the attenuation values are very high. Finally, the device according to the invention may be produced not only with a planar structure, but also with a cylindrical structure.

In accordance with the present invention, there is provided a device for modulating optical radiation by a variable magnetic field, said device comprising a waveguide formed by a thin magnetic layer and a substrate, said magnetic layer being deposited on said substrate with a constant thickness and being capable of propagating a first and second modes of radiated energy; said device further comprising means for exciting energy of said first mode in said magnetic layer, means for inducing a variable magnetic field parallel to the direction of propagation of said energy to enable at least a fraction of said energy to be converted from said first mode to said second mode, selecting means for selectively transmitting the energy of one of said first and second modes and means for extracting the energy transmitted by said selecting means.

For a better understanding of the present invention, and to show how the same may be carried into effect, reference will be made to the ensuing description and the accompanying drawings wherein:

FIGS. 2 and 4 illustrate the variations in intensity in each mode in two particular cases.

FIG. 3 is an explanatory diagram.

FIG. 5 is a cross-section through a device of cylindrical structure.

FIG. 6 is a longitudinal section through one embodiment of the invention.

Figure 1:
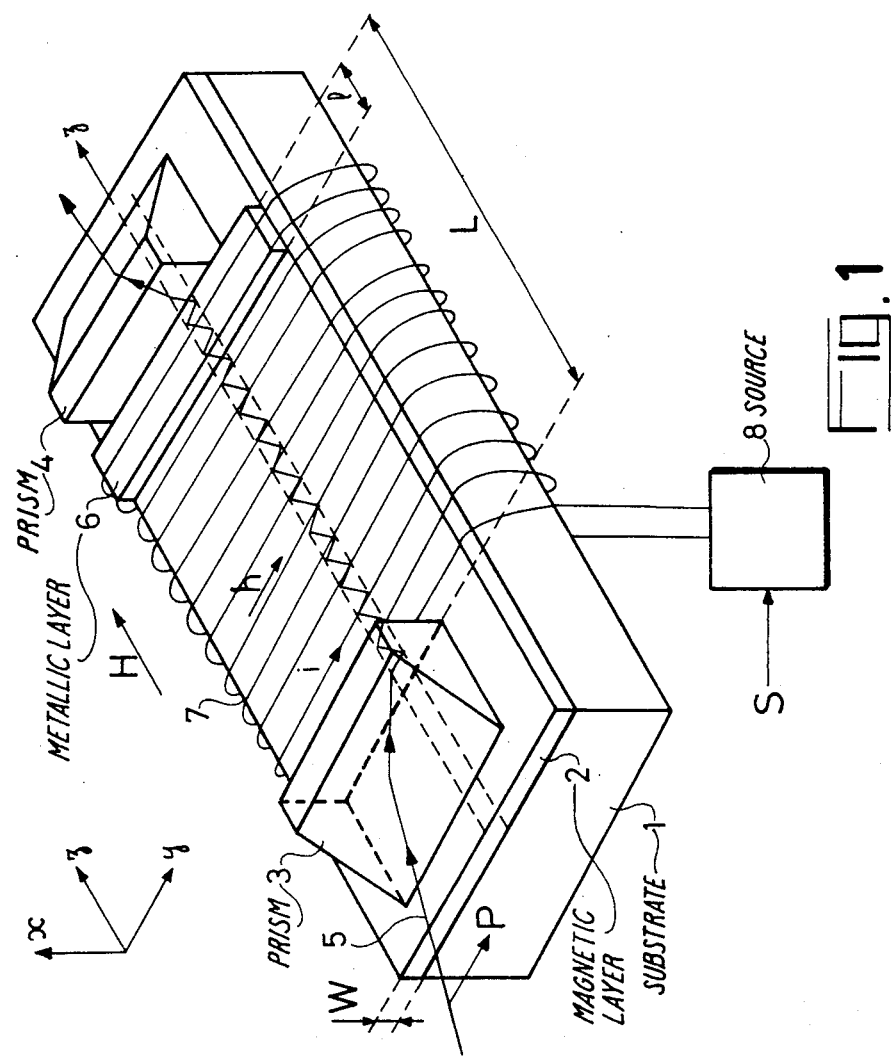
FIG. 1 shows one embodiment of the invention.

FIG. 1 shows one embodiment of an integrated modulator for optical radiation which utilises magneto-optical effects. Hereinafter the expression "optical radiation" will be used for any radiation which is situated between the ultraviolet and infrared regions of the spectrum. The device comprises two superposed planar layers: a substrate 1 having a refractive index $n_1$ and a thin magnetic layer 2 having a thickness W and a refractive index $n_2$ higher than $n_1$ and than the index $n_0$ of the ambient medium so that radiated energy can be guided by total reflections at the diopters formed by the layer 2 and the substrate 1 and by the layer 2 and the ambient medium. A beam of energy 5, of which the polarisation P is in a direction y in the plane of the layer yz, i.e. in a mode TE, is introduced into the layer 2 where it is propagated in a direction z perpendicular to y and is then removed from the layer after a length L. The means by which the energy is introduced and removed are, for example, prisms 3 and 4 of which the base is arranged opposite the upper face of the layer 2. The angle of incidence of the beam 5 on the prism 3 enables the energy to be transferred towards the layer 2. A metallic layer 6 is deposited on the layer 2 behind the propagation, i.e. in front of the prism 4. This metallic layer 6 has the property of absorbing the electromagnetic waves of which the electrical field (i.e. the polarisation) is perpendicular to the plane of the layer, without disturbing the waves of which the electrical field is parallel to said plane. However, when the thickness of the layer 2 is minimal, the waves polarised parallel to the plane are partially absorbed by the metallic layer 6. In order to obviate this disadvantage, it is sufficient to insert a very thin dielectric layer (thickness around 0.3 $\mu$m) between the layer 2 and the metallic layer 6. The layer 2 is magnetised in the direction z by a variable magnetic field H obtained for example, by a solenoid 7 traversed by a current i provided by a current source 8. The variations in intensity of the current i and hence of the field H characterise, for example, an item of informatin S to be transmitted. The magnetisation induced in the layer 2 causes the polarisation of the beam 5 to rotate by Faraday effect through an angle which is proportional on the one hand to the interaction length and on the other hand to the projection of the magnetisation in the propagation direction up to a limit value $\theta = k\,L$, where L is the interaction length and k is a constant. If L is such that $\theta = \pi/2$, the beam 5 which initially was polarised in the direction y becomes polarised perpendicularly of y. Accordingly, the propagating mode of the beam becomes a TM mode providing the thickness of the layer is not too small so that the incidence of the rays capable of being propagated in relation to the diopters limiting the layer is almost grazing. In reality, only a fraction of the energy of the beam is thus converted. This fraction depends upon the difference between the guided propagation velocities in the two propagation modes. The electrical field of the converted wave may be divided into two components along the axis y and an axis x perpendicular to y and z. It has been seen that the metallic layer 6 enables the component directed along X to be eliminated. Accordingly, the energy collected at the exit is lower, the nearer the angle $\theta$ comes to $\pi/2$ (to within $\pi$). FIG. 2 (b) shows the variation of the intensities $I_E$ and $I_M$ of the two components of the guided wave which may be called respectively the TE wave and the TM wave, after a length L when the variations in the magnetic field, shown in FIG. 2 (a), are sinusoidal of period T. The length L is preferably selected in such a way that the angle $\theta$ is equal to $\pi/2$ (to within $\pi$) when H is maximal: $H_0$ being the maximal value of H, $\theta = \pi/2$ where $H = H_0$ and $\theta = -\pi/2$ where $H = -H_0$. Where $H = 0$, there is no rotation, so that the intensity $I_E$ of the TE wave is maximal and equal to the incident intensity $I_0$, whereas the intensity $I_M$ of the TM wave is zero. When H increases, $I_E$ decreases whereas $I_M$ increases; for $t = T/4$, $H = H_0$, $\theta = \pi/2$ and the conversion between the two modes is maximal, so that $I_E$ is minimal and has a value $I_1$, whereas $I_M$ is maximal and therefore has the value $I_0-I_1$. Where H decreases from $H_0$ to 0, $I_E$ increases from $I_1$ to $I_0$ and $I_M$ decreases from $I_0-I_1$ to 0. The variations in $I_E$ and $I_M$ are in phase opposition and have twice the frequency of the variations of the magnetic field H. Since the intensity collected at the exit is $I_E$, an intensity modulator has been obtained. Instead of converting a TE mode into a TM mode, it would of course be possible to effect the opposite conversion. In this case, when H=0, the intensity collected at the exit, $I_E$, is minimal and modulation takes place in phase opposition by comparison with the preceding case. Although the choice of the length L has enabled the modulation level $I_0/I_1$ to be maximised, this level is lower the greater is the difference between the propagation velocities of the energy in the TE and TM modes.

In order to increase the modulation level, an improvement may be made to the device shown in FIG. 1 by ensuring that this difference is zero. FIG. 3 explains the phenomena which is used for this purpose. It shows the curves representing the thickness W of the layer 2 as a function of the effective indices $N_E$ and $N_M$ characterising the propagation velocities of waves propagated in the TE and TM modes in question. It has been assumed for example that the thickness W is so minimal that only the $TE_0$ and $TM_0$ modes can be propagated. The curves shown at (a) are those which may be experimentally obtained in the general case: the indices $N_E$ and $N_M$ vary between the values $n_1$ and $n_2$ which are respectively the indices of the substrate 1 and the layer 2. $N_E$ is always higher than $N_M$. The curves shown at (b) are obtained when the recommended improvement is adopted, this improvement consisting in depositing on the substrate 1 by epitaxy a layer 2 having a composition such that the epitaxy makes it anisotropic, so that the layer 2 has different indices according to the direction of the polarisation: $n_{2E}$ for the TE modes and $n_{2M}$ for the TM modes. Accordingly, the effective index $N_E$ varies between $n_1$ and $n_{2E}$, while the effective index $N_M$ varies between $n_1$ and $n_{2M}$. It can be seen from the curve that there is a value e of the thickness W for which $N_E$ is equal to $N_M$, which is the required result. Since the difference $n_{2E}-n_{2M}$ depends upon the composition of the epitaxial layer, it is possible experimentally to determine the composition which enables the indices $N_E$ and $N_M$ to be equalised in dependence upon the required thickness e. In accordance with this possibility, a device was produced in which the substrate was a garnet of gadolinium and gallium and the layer a garnet of yttrium and iron deposited by epitaxy on the substrate 1 with substituted atoms of gadolinium and gallium. For a thickness e of 4.5 μm, the composition of the layer is $Gd_{0.45} Y_{2.55} Ga_{0.9} Fe_{4.1} O_{12}$. A structure such as this gave the variation curves of FIG. 4 which at (b) shows the variations in $I_E$ and $I_M$ when the variations in H shown at (a) are sinusoidal. In this example of embodiment, the wavelength of the beam 5 is 1.15 μm, the prisms 4 and 5 being made of rutile. The length L is 6 mm. The metallic layer 6 is made of aluminium, its length being 3 mm and its thickness 1 μm. For a modulation field of 5 oe, the attenuation of the $TM_O$ mode obtained amounts to 60 dB and the ratio $(I_0-I_1)/(I_0+I_1)$ to 90%.

In the practical application of the invention, it is important to ensure that, in the absence of a modulating field, there is no Faraday effect. In addition, it is preferable to avoid the parasitic magneto-optical effects which could interfere with the conversion of the TE mode into the TM mode. These parasitic magneto-optical effects are in particular the Cotton-Mouton effect which is another cause of change in the polarisation when the magnetisation of the medium is perpendicular to the energy propagation direction, i.e. in the plane xy. This effect depends upon the angle of magnetisation with the polarisation direction. In particular, when the magnetisation is parallel to the initial polarisation, this effect is zero. With a layer having the composition indicated above, a spontaneous magnetisation is obtained in the plane yz. In order to orient the spontaneous magnetisation parallel to the initial polarisation, the device can be placed in the air gap of a magnet which, by a constant field h, forces the magnetisation into the direction y. Since the modulating field is in the propagation direction, the Cotton-Mouton effect is not in evidence, so that only the conditions of the Faraday effect prevail.

The invention is not limited to guiding by a device having a planar structure. It is also possible to produce a guide having a cylindrical structure. FIG. 5 shows respectively at (a) and (b) the entrance and exit cross-sections through such a guide, comprising a core 10 of radius a which forms the substrate and a layer 20 of thickness W in which the energy is guided. The layer 20 is preferably obtained by epitaxy on the core 10. The constituent materials of the guide may be the same as before. It can be shown that there exists a series of propagation modes commonly called $HE_{1m}$ and $EH_{1m}$ for which either the electrical field or the magnetic field is in a plane perpendicular to the propagation direction z. The form of the field lines is not as simple as for rectangular guides. However, providing the thickness W of the layer is sufficiently small by comparison with the radius a of the core 10 and providing the propagation constant of the principal mode is similar to the cut-off propagation constant, the polarisation retains approximately a fixed direction, which is that of the polarisation P of the incident wave, in every plane perpendicular to the propagation direction. If the incident wave is polarised in the direction x, at the entrance of the guide, shown in (a), the electrical field E is parallel to x. After a length L, at the exit of the guide, shown in (b), the field E has turned through $\pi/2$ by Faraday effect, and is directed along y perpendicular to x. The field E is constant over any circle of radius $\rho(a<\rho<a+W)$; its value varies as a function of $\rho$. The value e of the thickness of the epitaxial layer which provides for equalisation of the propagation indices $N_X$ and $N_Y$ corresponding respectively to the dominant mode for a polarisation parallel to x and to the corresponding dominant mode for a polarisation parallel to y is determined in the same way as for the planar guide.

FIG. 6 is a longitudinal section through an embodiment of the invention. The incident beam 50 polarised in a direction x is coupled onto a fibre 11 which acts as coupling fibre and which enables the electro-magnetic energy to be distributed at the periphery of the guide, i.e. in the epitaxial layer 20. The coupling fibre 11 is coupled with the guide, generally by direct coupling. The guide is placed in the air gap of a permanent magnet 14 by which it is possible, in the absence of a modulating field, to obtain a magnetisation $M_0$ directed in a plane normal to the propagation direction z in the direction x so as to be parallel to the initial polarisation and hence to eliminate the Faraday effect when there is no modulating magnetic field and the Cotton-Mouton effect. In addition, the guide is inside a solenoid 70 fed by the modulation signal S through a current source 80 in the same way as for the guide shown in FIG. 5 and supplying a modulating field H in the propagation direction z. The length L is such that a maximum modulation level is obtained, in other words the polarisation has been turned through an angle of $\pi/2$ for a maximal modulating field. Coupling means 13 enable the guide to be connected to a polariser 60 which only retains that component of the electromagnetic field which is polarised parallel to x.

Figure 7:
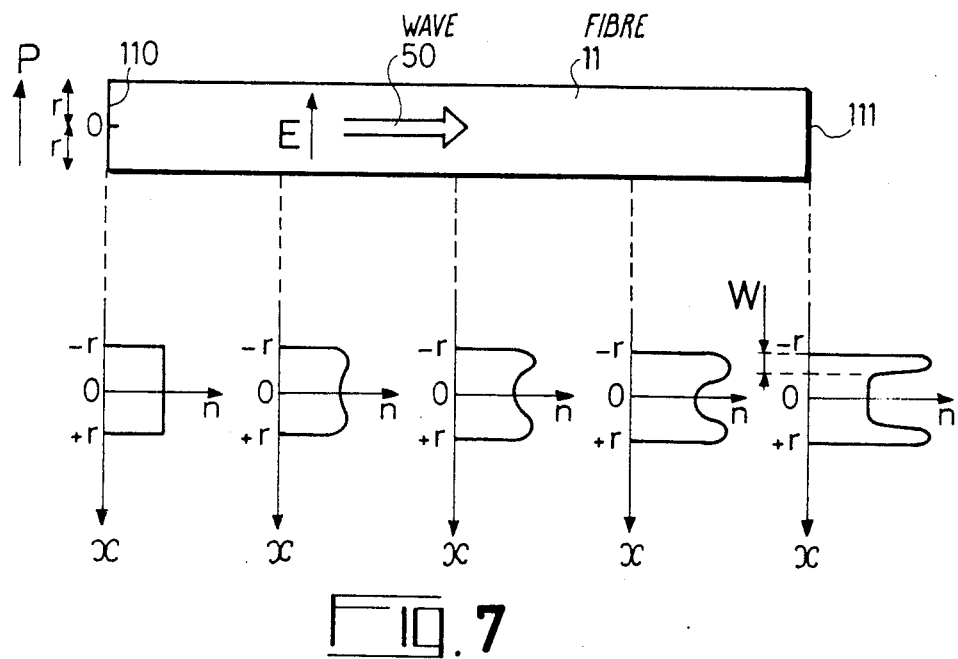
FIGS. 7 and 8 show details of the device illustrated in FIG. 6.

FIG. 7 shows one embodiment of the coupling fibre 11. The wave 50 is propagated in the core of the fibre which is the only part of the fibre shown in the Fig. Its radius r is equal to the radius a+W of the guide. Its propagation index n is constant at the upstream end 110. At the downstream end 111, n is considerably higher at the periphery than at the centre. The index distribution varies progressively from one end to the other, as shown in the Fig. Thus, at the downstream end, the electromagnetic energy is concentrated at the periphery of the fibre in a ring of thickness W equal to the thickness of the epitaxial layer 20 of the guide. In order to obtain an index distribution such as this, the periphery of the fibre may be progressively doped, the doping level being zero at the end 110 and maximal at the end 111. This coupling fibre 11 does not alter the orientation of the electrical field E which remains approximately parallel to x providing that was the orientation of the polarisation P of the incident beam.

Figure 8:
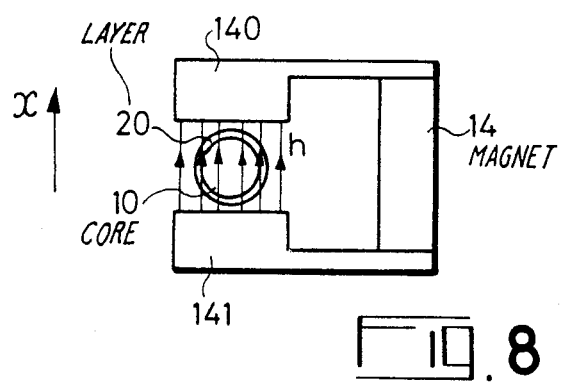

FIG. 8 is a cross-section through the guide and the device enabling a permanent magnetisation $M_0$ to be obtained in the direction x. It consists of a magnet 14. The size of the air gap is adapted to the dimensions of the guide. The guide is placed between the two armatures 140 and 141. Between these twoi armatures there is a magnetic field h which enables the magnetisation $M_0$ of the magnetic layer 20 to be oriented. This same type of magnet may also be used for a rectangular guide such as that shown in FIG. 1.

What we claim is:

1. A device for modulating optical radiation by a variable magnetic field, said device comprising a wave guide formed by a thin magnetic layer and a substrate, said magnetic layer being deposited on said substrate with a constant thickness and being capable of propagating first and second modes of radiated energy; said device further comprising means for exciting energy of said first mode in said magnetic layer, means for inducing a variable magnetic field parallel to the direction of propagation of said energy to enable at least a fraction of said energy to be converted from said first mode to said second mode, mode absorbing means arranged on said magnetic layer for selectively transmitting the energy of one of said first and second modes and means arranged for extracting from said magnetic layer the energy supplied in one of said modes by said mode absorbing means.

2. A device as claimed in claim 1, wherein said substrate is formed by a garnet of gadolinium and gallium.

3. A device as claimed in claim 2, wherein said magnetic layer is formed by a garnet of yttrium and iron with substituted gadolinium and gallium atoms.

4. A device as claimed in claim 3, wherein said magnetic layer is obtained by epitaxy on said substrate, said thickness being such that the propagation velocity of the energy is the same for said first and second modes.

5. A device as claimed in claim 1, said device further comprising means for inducing a continuous magnetic field which ensures that, in the absence of said variable magnetic field, the magnetisation of the magnetic layer is perpendicular to said propagation direction.

6. A device as claimed in claim 1, wherein said magnetic layer is a planar layer.

7. A device as claimed in claim 6, wherein said mode absorbing means comprise a metallic layer deposited on a part of said magnetic layer so as to absorb the fraction of energy of which the direction of polarisation is perpendicular to the major faces of said magnetic layer.

8. A device as claimed in claim 7, wherein said mode absorbing means further comprise a dielectric layer inserted between said magnetic layer and said metallic layer to prevent any absorption of waves polarised parallel to the major faces of the magnetic layer.

9. A device as claimed in claim 1, wherein said substrate is cylindrical.

10. A device as claimed in claim 9, wherein said excitation means comprise an optical fibre having an index gradient, the energy propagated by said fibre being progressively concentrated in its periphery.

* * * * *